US009411552B2

(12) United States Patent
Jepsen

(10) Patent No.: US 9,411,552 B2
(45) Date of Patent: Aug. 9, 2016

(54) BEZEL PIXEL LAYER IN MULTI-PANEL DISPLAY

(71) Applicant: Google Inc., Mountain View, CA (US)

(72) Inventor: Mary Lou Jepsen, Sausalito, CA (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 13/942,974

(22) Filed: Jul. 16, 2013

(65) Prior Publication Data

US 2015/0022424 A1    Jan. 22, 2015

(51) Int. Cl.
*G09G 5/00* (2006.01)
*G06F 3/14* (2006.01)
*G09F 9/302* (2006.01)

(52) U.S. Cl.
CPC ............ *G06F 3/1446* (2013.01); *G09F 9/3026* (2013.01); *G09G 2310/0232* (2013.01); *G09G 2340/04* (2013.01); *G09G 2340/0464* (2013.01)

(58) Field of Classification Search
CPC .............. G06F 3/1446; G02F 1/13336; G09G 2300/026; G09F 9/3026; H01L 27/3293; H04N 9/3147
USPC ....................................................... 345/1.1–4
See application file for complete search history.

(56) References Cited

U.S. PATENT DOCUMENTS

| 8,258,685 B2 | 9/2012 | Kindler et al. |
| 2002/0118321 A1* | 8/2002 | Ge .................................. 349/73 |
| 2007/0001927 A1 | 1/2007 | Ricks et al. |
| 2008/0204356 A1* | 8/2008 | Shim ..................... G06F 1/1616 345/1.3 |
| 2010/0001925 A1* | 1/2010 | Kim et al. ...................... 345/1.3 |
| 2010/0238090 A1 | 9/2010 | Pomerantz et al. |
| 2010/0301777 A1* | 12/2010 | Kraemer ....................... 315/312 |
| 2010/0327185 A1 | 12/2010 | Kindler et al. |
| 2011/0018849 A1 | 1/2011 | Lowe et al. |
| 2011/0102300 A1* | 5/2011 | Wood et al. ..................... 345/1.3 |
| 2012/0050314 A1* | 3/2012 | Wang ............................. 345/619 |

FOREIGN PATENT DOCUMENTS

| CN | 101620846 A | 1/2010 |
| CN | 102055989 A | 5/2011 |
| KR | 10-2010-0000116 A | 1/2010 |

OTHER PUBLICATIONS

Lee Sung Ho, Multi Screen Device Using Multiple Display Panel, May 24, 2010, KPO, pp. 1-12 (KIPO machine translation of foreign document submitted in IDS).*
PCT/US2014/042385; PCT International Search Report and Written Opinion, mailed Oct. 27, 2014, 9 pages.
TW 103122689—First Office Action, with English translation, issued Feb. 15, 2016, 10 pages.
PCT/US2014/042385; PCT International Preliminary Report on Patentability, mailed Jan. 28, 2016, 8 pages.

* cited by examiner

*Primary Examiner* — Gustavo Polo
(74) *Attorney, Agent, or Firm* — Blakely Sokoloff Taylor & Zafman LLP

(57) ABSTRACT

A multi-panel display system includes an array of display panels arranged to be viewed as a multi-panel display. The multi-panel display includes a bezel pixel layer covering a bezel region of the multi-panel display. The bezel region is between pixel regions of the display panels in the array. The multi-panel display system also includes a display engine communicatively coupled to drive the display panels to display image sections and communicatively coupled to drive the bezel pixel layer to display a bezel shaped image section. The image sections and the bezel shaped image sections are subsections of a unified overall-image to be displayed on the multi-panel display.

14 Claims, 14 Drawing Sheets

UNIFIED IMAGE
465

BEZEL PIXEL LAYER IN MULTI-PANEL DISPLAY

TECHNICAL FIELD

This disclosure relates generally to large format displays, and in particular but not exclusively, relates to multi-panel displays.

BACKGROUND INFORMATION

Large displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall-image collectively displayed by multi-panel display 105. While multi-panel display 105 can reduce costs, visually it has a major drawback. Each display panel 100 includes a bezel 110 around its periphery. Bezel 110 is a mechanical structure that houses pixel region 115 in which the display pixels are disposed. In recent years, manufactures have reduced the thickness of bezel 110 considerably—to less than 2 mm in some instances. However, even these thin bezel trims are still very noticeable to the naked eye, distract the viewer, and otherwise detract from the overall visual experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for displaying images on a multi-panel display that includes a bezel pixel layer are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
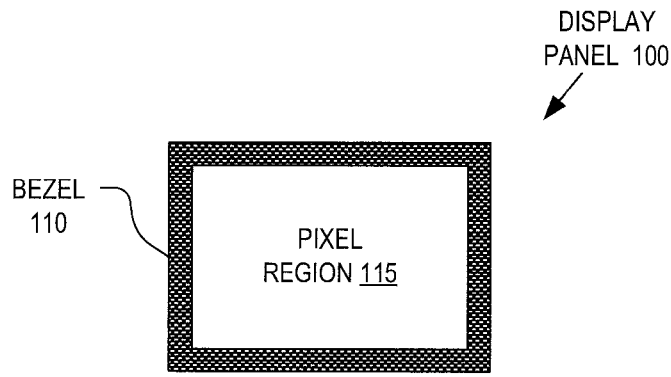
FIGS. 1A and 1B illustrate conventional display panel tiling.
Figure 1B:
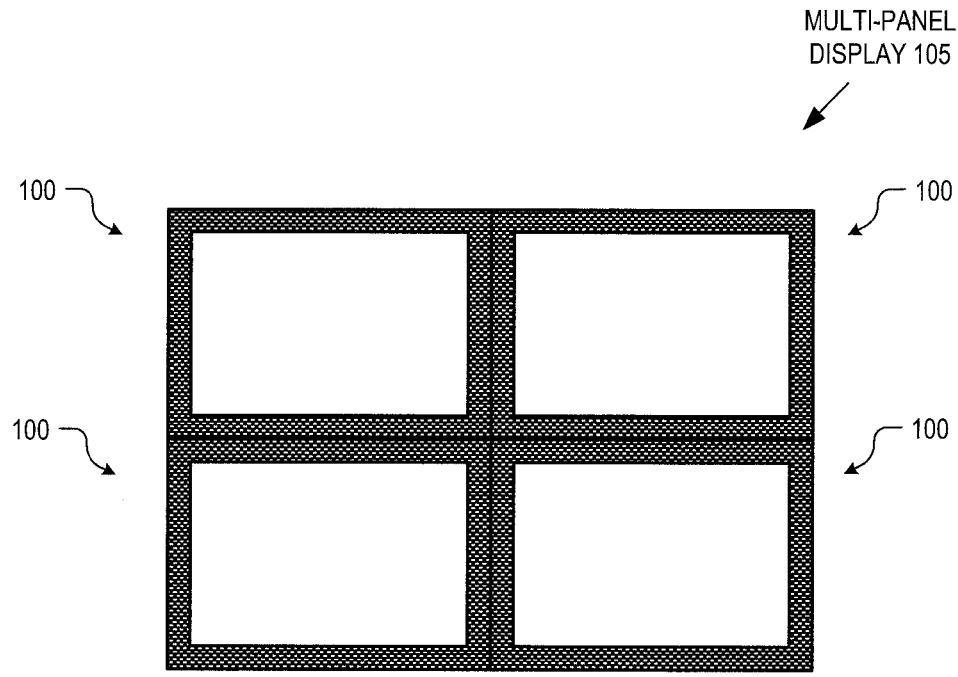
Figure 2A:
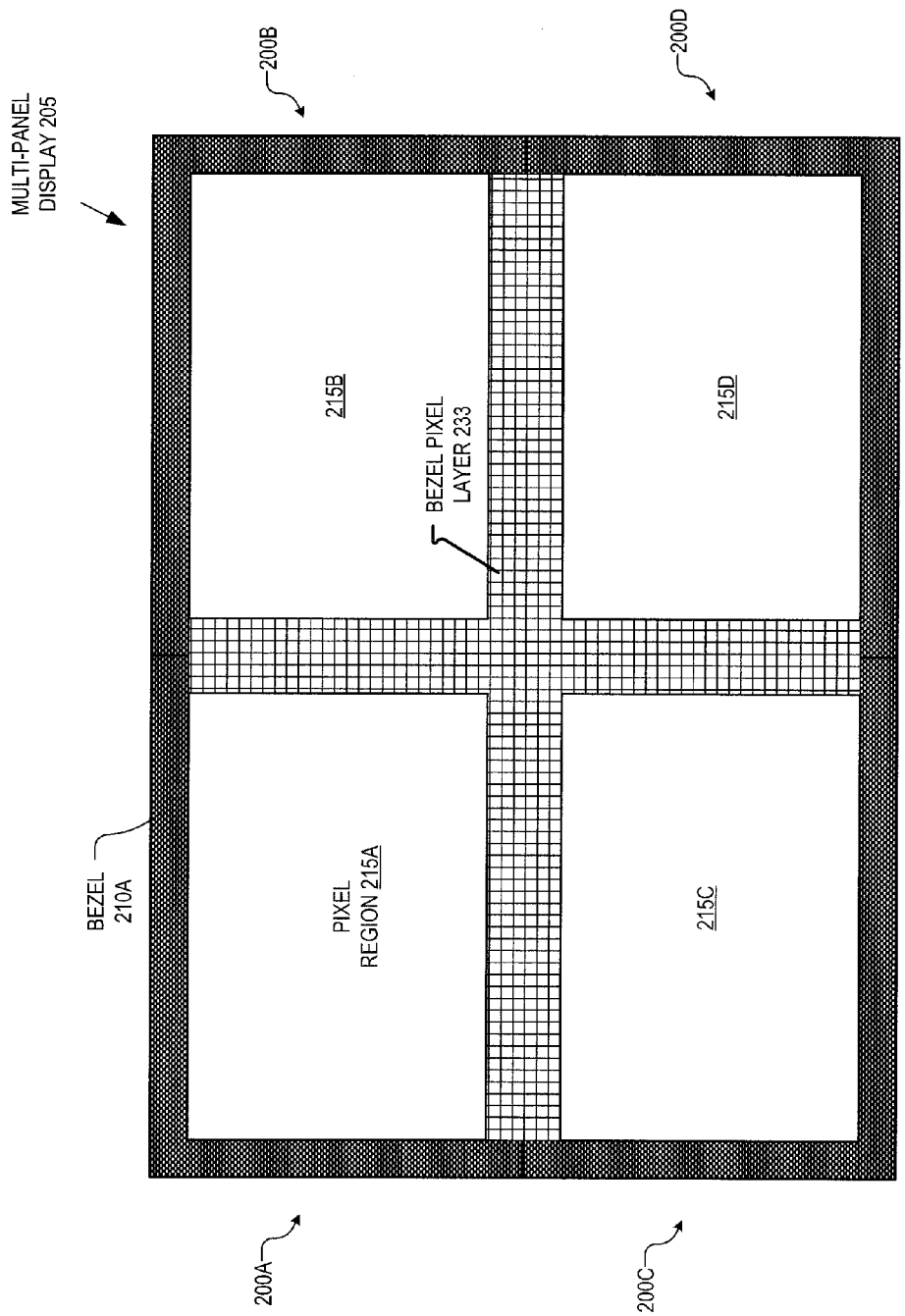
FIGS. 2A and 2B illustrate display panels arranged to be viewed as a multi-panel display with a bezel pixel layer covering a bezel region between pixel regions of the display panels, in accordance with an embodiment of the disclosure.
Figure 2B:
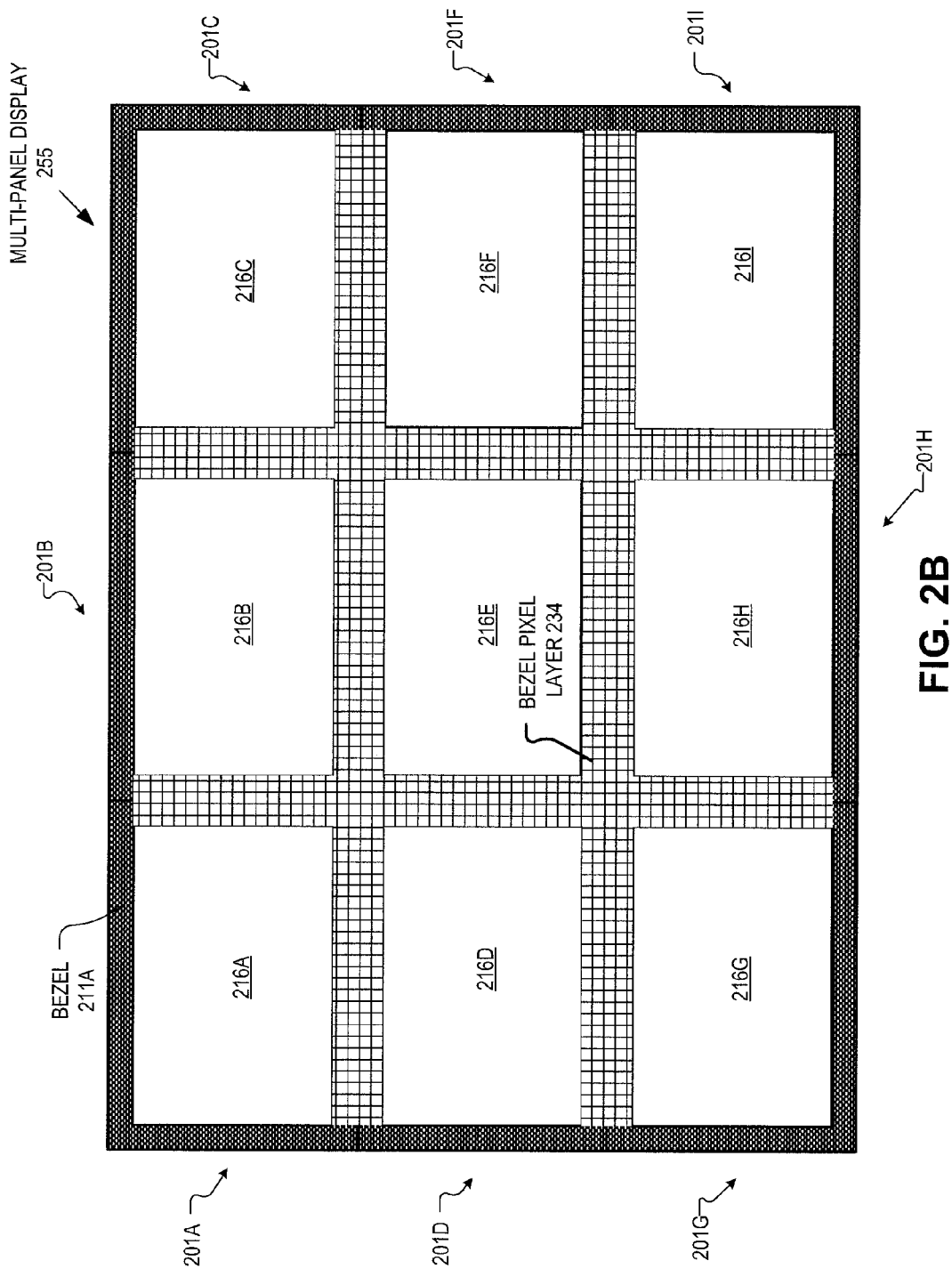

FIGS. 2A and 2B illustrate display panels arranged to be viewed as a multi-panel display with a bezel pixel layer covering a bezel region between pixel regions of the display panels, in accordance with an embodiment of the disclosure. FIG. 2A shows four display panels 200 that are arranged to be viewed as a multi-panel display 205. Each display panel 200 may be a liquid-crystal-display ("LCD"), for example, that is commercially available for use as a television or flat panel monitor. The four display panels 200A-200D are arranged in a two-by-two matrix and each display panel 200 includes a corresponding bezel 210 and pixel region 215. In FIG. 2A, multi-panel display 205 includes a bezel pixel layer 233 shaped as a cross and covering a bezel region of multi-panel display 205. The bezel region covered by the bezel pixel layer 233 is between pixel regions 215A-215D of the display panels 200A-200D of the multi-panel display 205. FIG. 2B shows nine display panels 201 that are arranged to be viewed as a multi-panel display 255. The nine display panels 201A-201I are arranged in a three-by-three matrix and each display panel 201 includes a corresponding bezel 211 and pixel region 216. In FIG. 2B, multi-panel display 255 includes a bezel pixel layer 234 shaped as a "pound sign" or "hashtag" that covers a bezel region of multi-panel display 255. The bezel region covered by the bezel pixel layer 234 is between pixel regions 216A-216I of the display panels 201A-201I of the multi-panel display 255. Of course, the illustrated embodiments of FIGS. 2A and 2B are exemplary and embodiments of the disclosure are applicable to other display panel arrangements.

Figure 3A:
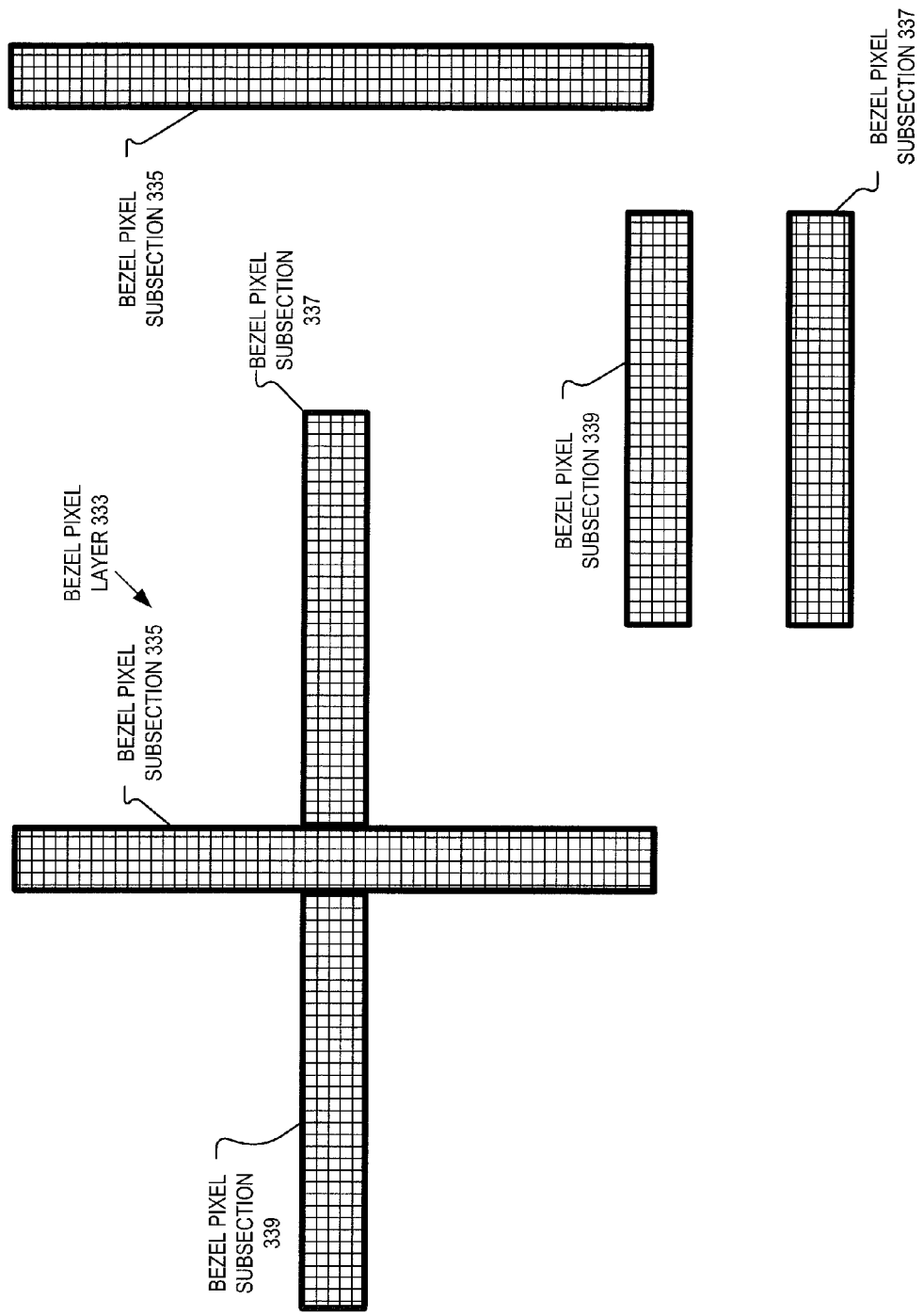
FIGS. 3A-3C illustrate example bezel pixel layer geometric configurations, in accordance with an embodiment of the disclosure.
Figure 3B:
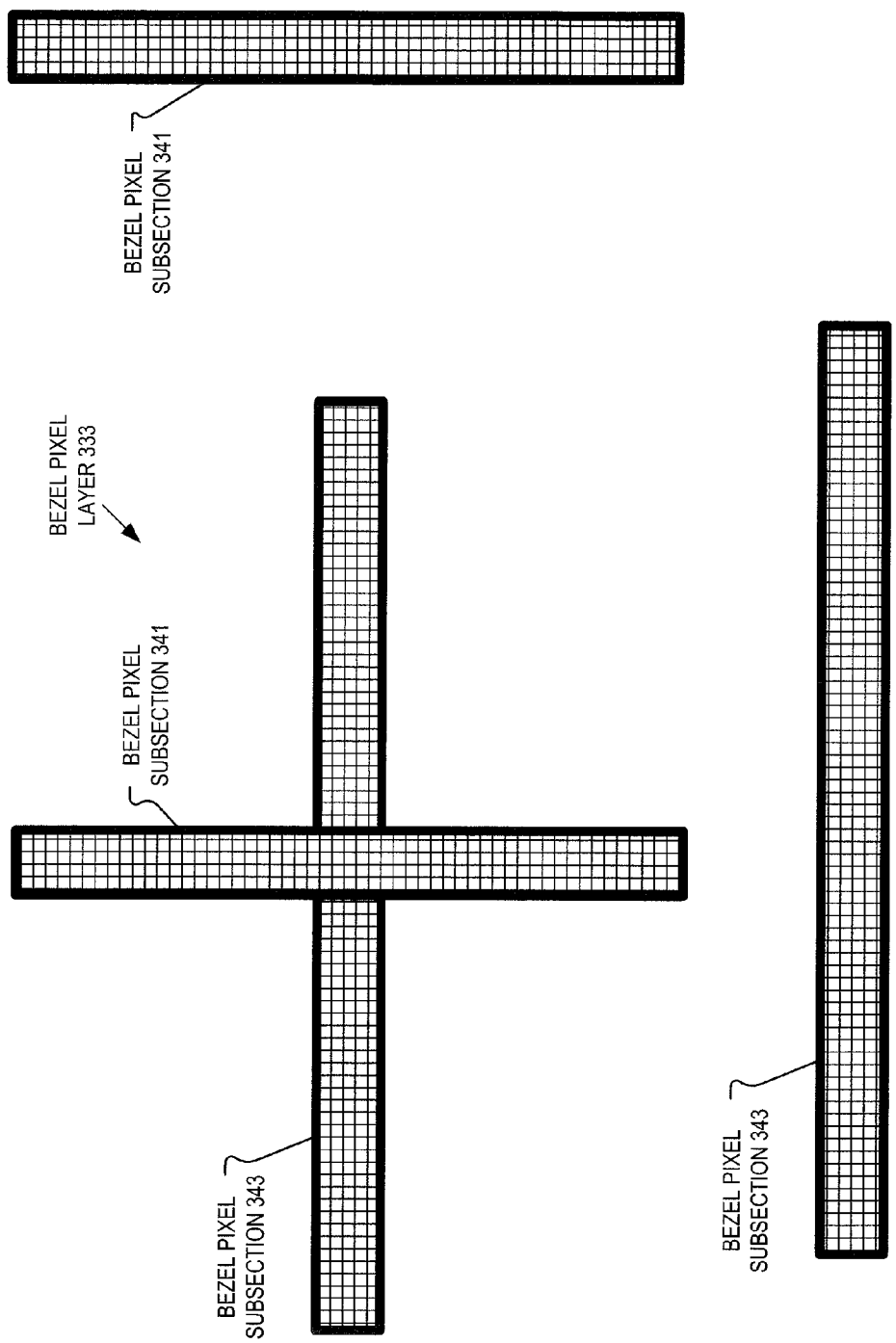
Figure 3C:
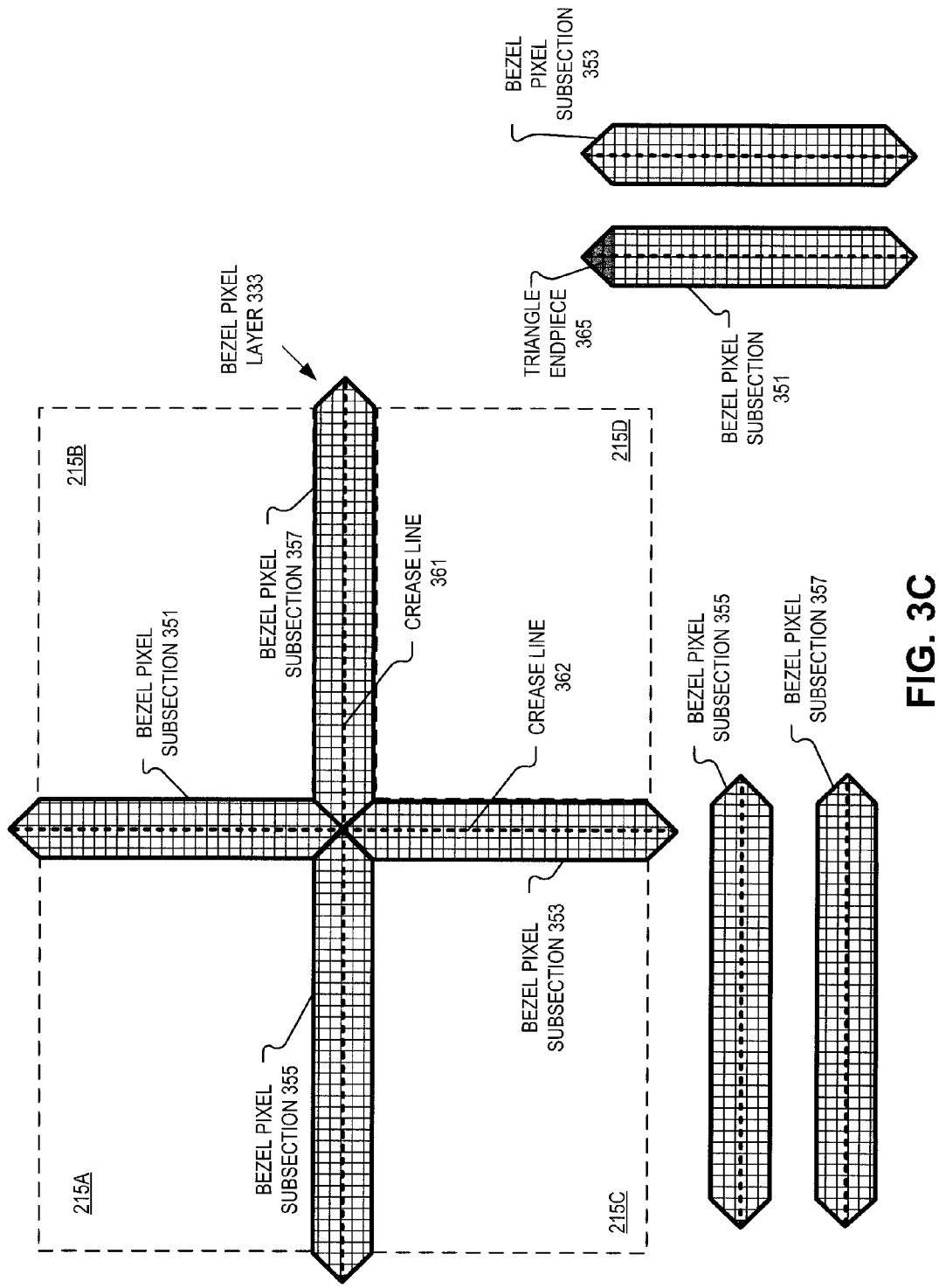

FIGS. 3A-3C illustrate example bezel pixel layer geometric configurations, in accordance with an embodiment of the disclosure. FIGS. 2A and 2B show bezel pixel layers 233 and 234 being monolithic layers. However, the bezel pixel layers in this disclosure may include examples where the bezel pixel layer is divided into bezel pixel subsections, such as in FIGS. 3A-3C.

In FIG. 3A, bezel pixel layer 333 includes bezel pixel subsections 335, 337, and 339. In the illustrated embodiment, bezel pixel subsection 335 is positioned vertically while bezel pixel subsections 337 and 339 are positioned horizontally and abut bezel pixel subsection 335 at its center. In one embodiment, bezel pixel subsections 337 and 339 are electrically connected to bezel pixel subsection 335 where they abut. The electrical connection may carry image and/or power signals between the bezel pixel subsections.

In FIG. 3B, bezel pixel layer 333 includes bezel pixel subsections 341 and 343. In the illustrated embodiment, bezel pixel subsection 341 is positioned vertically while bezel pixel subsections 343 is positioned horizontally, crossing bezel pixel subsection 341 at its center. Bezel pixel subsection 341 overlaps bezel pixel subsection 343, in FIG. 3B.

In FIG. 3C, bezel pixel layer 333 includes bezel pixel subsections 351, 353, 355, and 357. In the illustrated embodiment, each bezel pixel subsections 351, 353, 355, and 357 includes two triangle endpiece regions 365. In FIG. 3C, a triangle endpiece region 365 of bezel pixel subsection 351 is shaded for illustration purposes. The triangle endpiece regions 365 of the bezel pixel subsections may include electrical connectors to carry image and/or power signals between the bezel pixel subsections. In FIG. 3C, triangle endpiece regions 365 of each of bezel pixel subsections 351, 353, 355, and 357 come into very close proximity where a center of a multi-panel display would be. Pixel regions 215A-215D have been drawn in dashed lines to show where display panels 200 of multi-panel display 205 may be positioned with relation to bezel pixel subsections 351, 353, 355, and 357. Since a triangle endpiece region 365 of each of bezel pixel subsections 351, 353, 355, and 357 is outside where a rectangular unified over-all image would be displayed on multi-panel display 205, pixels in each of the triangle endpiece regions 365 may be in dark state so that the unified over-all image is rectangular. If multi-panel display 205 was expanded to the size of multi-panel display 255, additional bezel pixel subsections (similar to bezel pixel subsections 351, 353, 355, and 357) may be added to the configuration of FIG. 3C. At this point, pixels of some of the triangle endpiece regions 365 of the illustrated pixel subsections that were previously in a dark state will be driven "ON" to facilitate the larger rectangular unified over-all image displayed by multi-panel display 255.

FIG. 3C shows bezel pixel subsections 351, 353, 355, and 357 having crease lines 361 and 362, which may be used when the bezel pixel subsections are made to be flexible, such as with organic light-emitting-diode ("OLED") embodiments that are discussed below in connection with FIG. 5. Embodiments with crease lines 361 and 362 may allow display panels 200 to be folded into a smaller, more compact multi-panel display 205. This may be advantageous where display panels 200 are sized to be used in mobile devices.

Figure 4A:
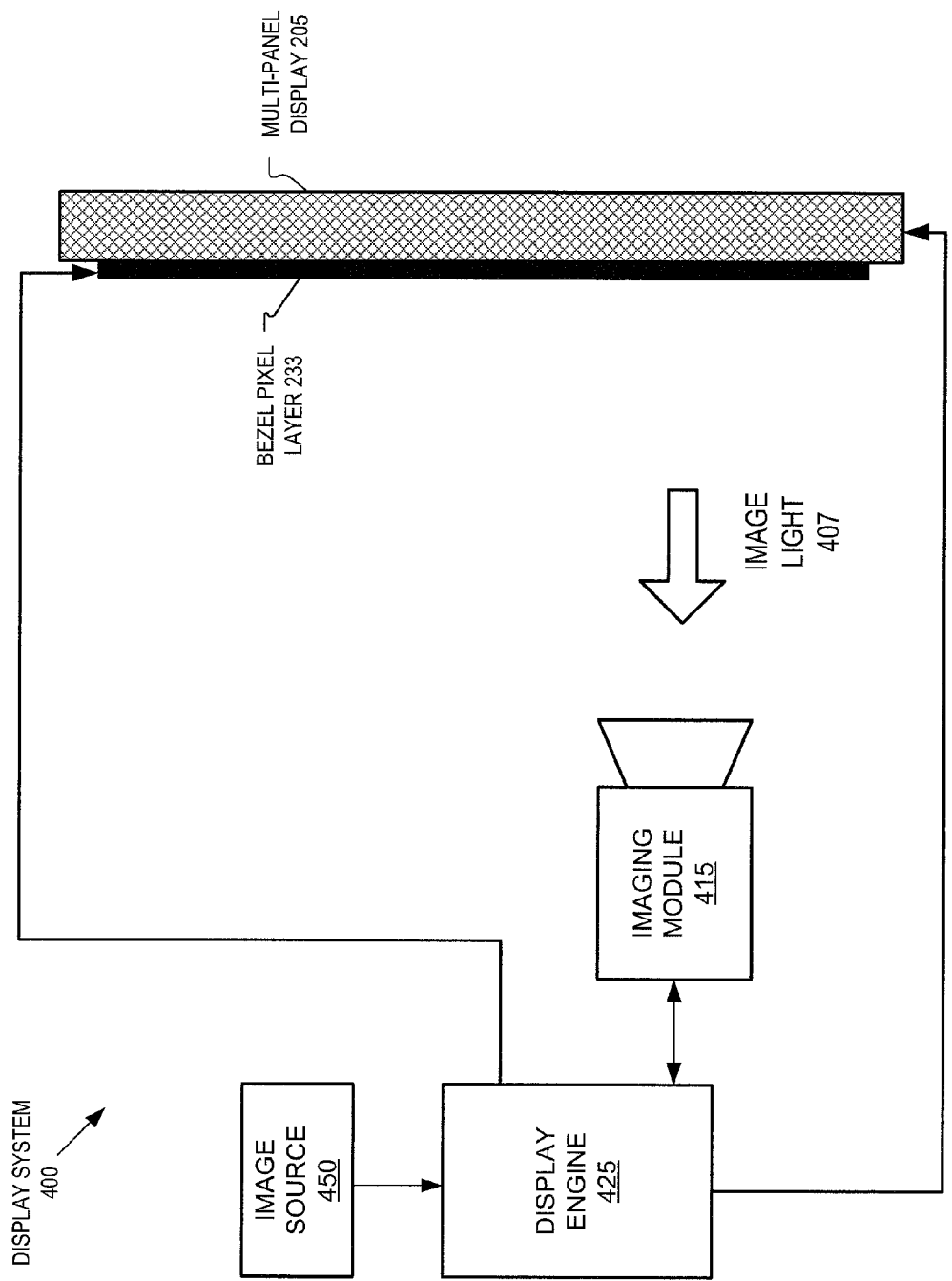
FIG. 4A illustrates an example display system including a multi-panel display, a display engine, and a bezel pixel layer, in accordance with an embodiment of the disclosure.

FIG. 4A illustrates an example display system 400 including multi-panel display 205, a display engine 425, and a bezel pixel layer 233, in accordance with an embodiment of the disclosure. Display engine 425 may include a processor, a Field Programmable Gate Array ("FPGA"), or other logic for processing image data. Display engine 425 may include memory to store settings, images, and other data received. In FIG. 4A, display engine 425 is communicatively coupled to drive each of the display panels 200 in multi-panel display 205 and also communicatively coupled to drive bezel pixel layer 233. It is appreciated that "communicatively coupled" includes wired connections as well as wireless connections.

In one embodiment, display engine 425 drives bezel pixel layer 233 and multi-panel display 205 over a wireless local area network ("WLAN") using an 802.11x standard as defined by the Institute of Electrical and Electronics Engineers ("IEEE"). If display engine 425 is connected to bezel pixel layer 233/234 via wires, the appropriate video and power signal connectors may be disposed on the ends of bezel pixel layer 233/234.

Display engine 425 is also communicatively coupled to receive image source data from an image source 450. Image source 450 may be a computer memory, an optical disc (e.g. DVD), or otherwise. In one embodiment, image source 450 resides on a remote server and is streamed from an online streaming service. Display engine 425 may parse the image source data into the appropriate sized sections for bezel pixel layer 233 and for displaying onto display panels 200 of multi-panel display 205.

Figure 4B:
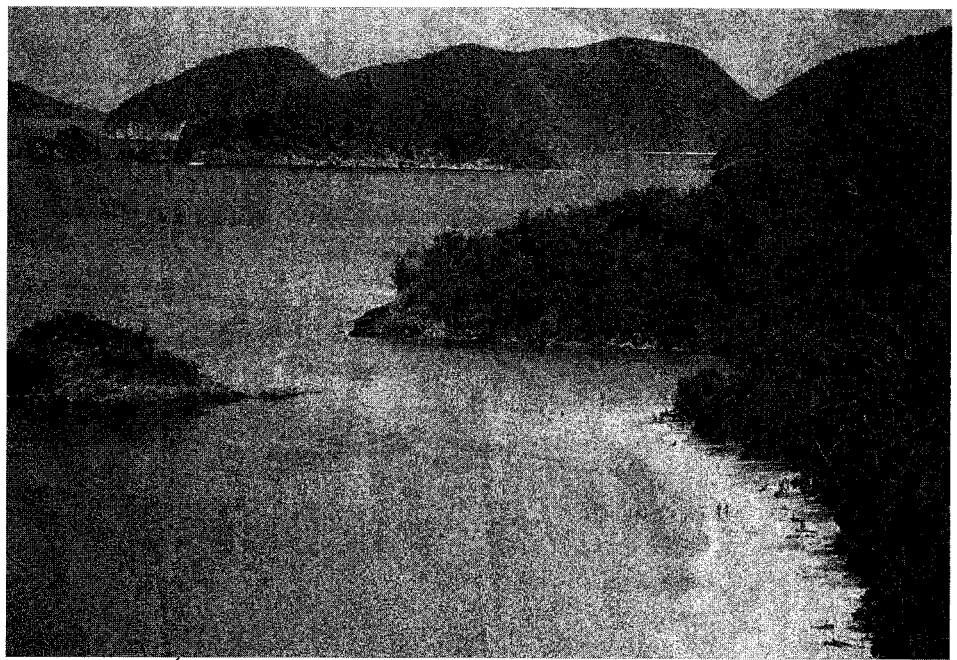
FIGS. 4B and 4C illustrate an example image and example pixel groups of an image, in accordance with an embodiment of the disclosure.
Figure 4C:
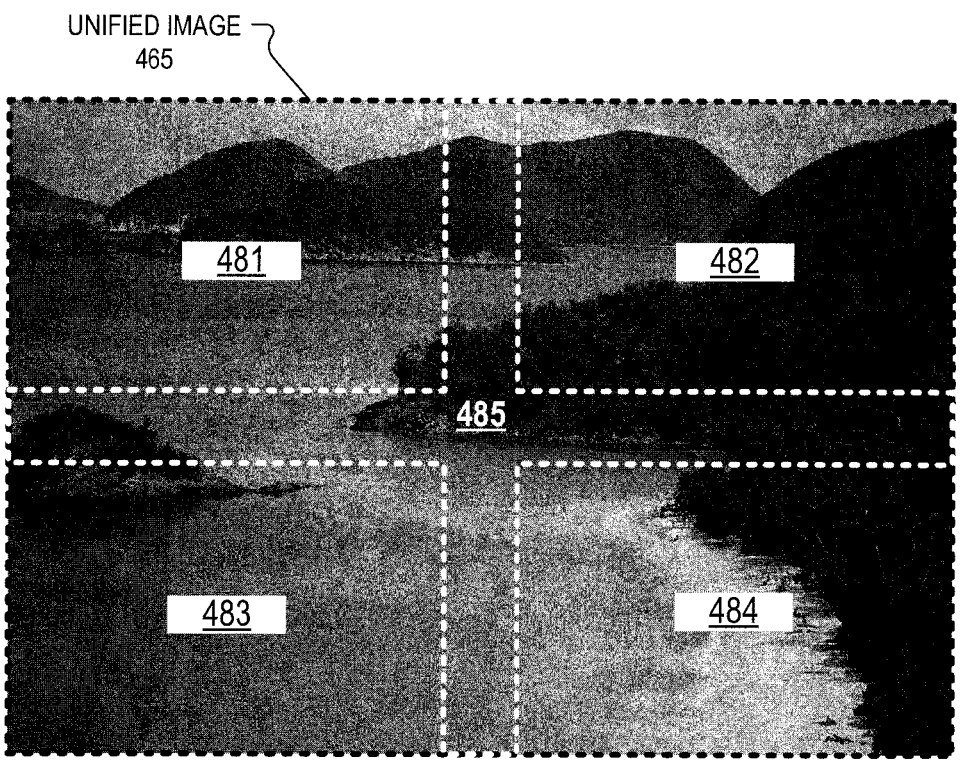

Turning to FIGS. 4B and 4C, a unified image 465 embedded in the image source data may be parsed into five pixel groups 481-485 by display engine 425. Pixel groups 481, 482, 483, and 484 may be designated as image section data to be displayed as image sections by display panels 200A, 200B, 200C, and 200D, respectively. Pixel group 485 (which is cross shaped) is designated as bezel image data to be displayed by bezel pixel layer 233. Display engine 425 can then send pixel groups 481, 482, 483, and 484 (designated as image section data) to multi-panel display 205 and send pixel group 485 (designated as bezel image data) to bezel pixel layer 233. As FIG. 4C shows, the five pixel groups, displayed as image sections by the display panels 200 and as a bezel shaped image section by bezel pixel layer 233 combine to form unified image 465, which is viewed on multi-panel display 205.

In FIG. 4A, display engine 425 is also communicatively coupled to receive imaging data from imaging module 415, which is positioned to image multi-panel display 205. Imaging module 415 may include an array of photodiodes, one or more Complementary Metal-Oxide-Semiconductor ("CMOS") image sensors, or otherwise. Display engine 425 may control imaging module 415 to image multi-panel display 205 and imaging module 415 may send the imaging data to display engine 425. In one embodiment, imaging module 415 is a mobile device (e.g. smartphone, tablet) that has a digital image sensor. A user may take a picture of multi-panel display 205 with the mobile device and the picture may be sent (via WLAN or cellular data) to display engine 425. Display engine 425 may adjust driving bezel pixel layer 233 or 234 in response to receiving the imaging data from imaging module 415. In one embodiment, display engine 425 causes imaging module 415 to measure image light 407 generated by multi-panel display 205. Display engine 425 may then analyze the brightness and color properties (e.g. spectral, white state, and/or color gamut) of the image light 407 that is generated by multi-panel display 205. Based on that analysis, display engine 425 may adjust display attributes of the bezel pixel layer 233 or 234. In one embodiment, adjusting the display attributes in response to image light 407 includes adjusting a global brightness of the bezel pixel layer 233 or 234. Depending on the display technology in the bezel pixel layer, adjusting a global brightness may include adjusting a backlight, LED, or OLED brightness. In one embodiment, adjusting the display attributes in response to image light 407 includes adjusting color properties of the bezel pixel layer. Depending on the display technology in the bezel pixel layer, adjusting color properties may include controlling an LCD panel, or adjusting the currents that drive red, green, and blue LED or OLED subpixels included in a pixel of the bezel pixel layer. Tuning bezel pixel layer 233 or 234 to match the properties of image light 407 will potentially give unified image 465 a more uniform appearance, when image light 407 is generated from display panels 200.

Figure 5:
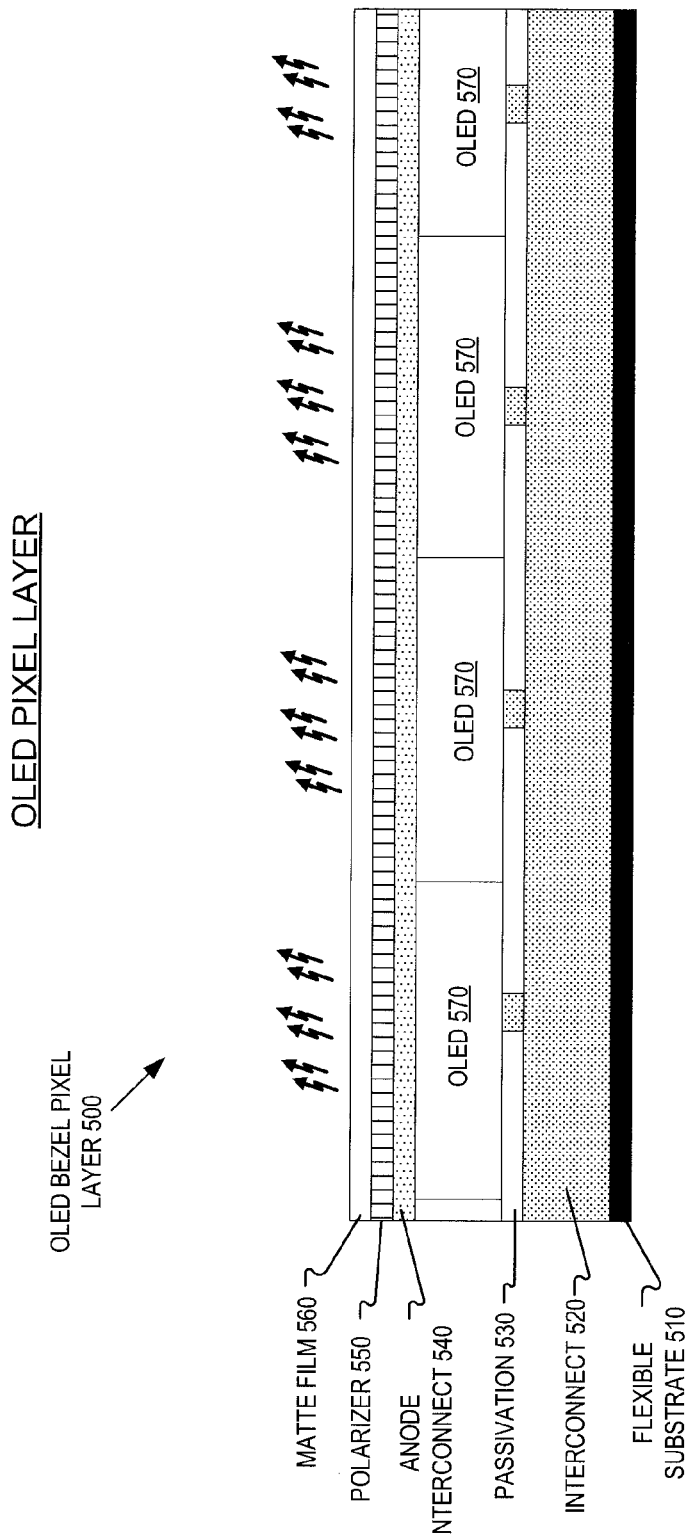
FIG. 5 illustrates an example bezel pixel layer that includes organic light-emitting-diodes ("OLEDs"), in accordance with an embodiment of the disclosure.

FIG. 5 illustrates a side view of an example OLED bezel pixel layer 500 that includes organic light-emitting-diodes ("OLEDs"), in accordance with an embodiment of the disclosure. The structure shown in FIG. 5 may be used in bezel pixel layer 233 or 234 as well as in the example bezel pixel subsections illustrated in FIG. 3A-3C. In the illustrated embodiment, OLED bezel pixel layer 500 includes an interconnect layer 520 disposed on a flexible substrate 510. In one embodiment, a rigid substrate may be substituted for flexible substrate 510. Interconnect layer 520 may include electrical routing and electrical structures such as transistors that drive OLED structures 570. Interconnect layer 520 is electrically connected to the cathode of each OLED structure 570, in FIG. 5. Passivation layer 530 may be formed on top of interconnect layer 520 for electrical isolation. In FIG. 5, interconnect layer 520 extends through passivation layer 530 in order to make electrical connection with OLED structure 570. OLED structure 570 may include a quantum well layer disposed between an n-doped semiconductor layer and p-doped semiconductor layer. The composition of the doped semiconductor layers in OLED structure 570 will depend on the desired emission wavelength of OLED 570. For color displays, red, green, and blue pixels may be formed in close proximity to make a red/green/blue color pixel. In the illustrated embodiment, an anode interconnect 540 is formed above OLED structure 570 and may be electrically connected to a p-doped semiconductor layer within OLED structure 570. A polarizer 550 and a matte film layer 560 may be added to OLED bezel pixel layer 500 to make OLED bezel pixel layer 500 generate an appearance very similar to the pixel regions 215 of display panels 200. An anti-glare ("AG") film (not pictured) may also be added to OLED bezel pixel layer 500.

The layers of the OLED array may be disposed (built up) on the flexible substrate 510 using conventional vapor deposition techniques or by conventional processes similar to ink-jet printing, as is known in the art. Since OLED bezel pixel layer 500 may be built with a flexible substrate 510, it may be particularly well suited to be used with the configuration of FIG. 3B, as bezel pixel subsection 341 is shown laid over (overlapping) bezel pixel subsection 343. Since OLED bezel pixel layer 500 may be only 0.5 mm thick, overlapping subsection 343 with subsection 341 will minimally impact the image planarity of multi-panel display 205. The flexible substrate 510 may also make OLED bezel pixel layer 500 a candidate to include crease lines 361 and 362, as illustrated in FIG. 3C. In one example, OLED bezel pixel layer 500 includes an adhesive on the bottom of flexible substrate 510 and OLED bezel pixel layer 500 is applied to the bezel region of multi-panel display 205/255 much like a piece tape.

Figure 6:
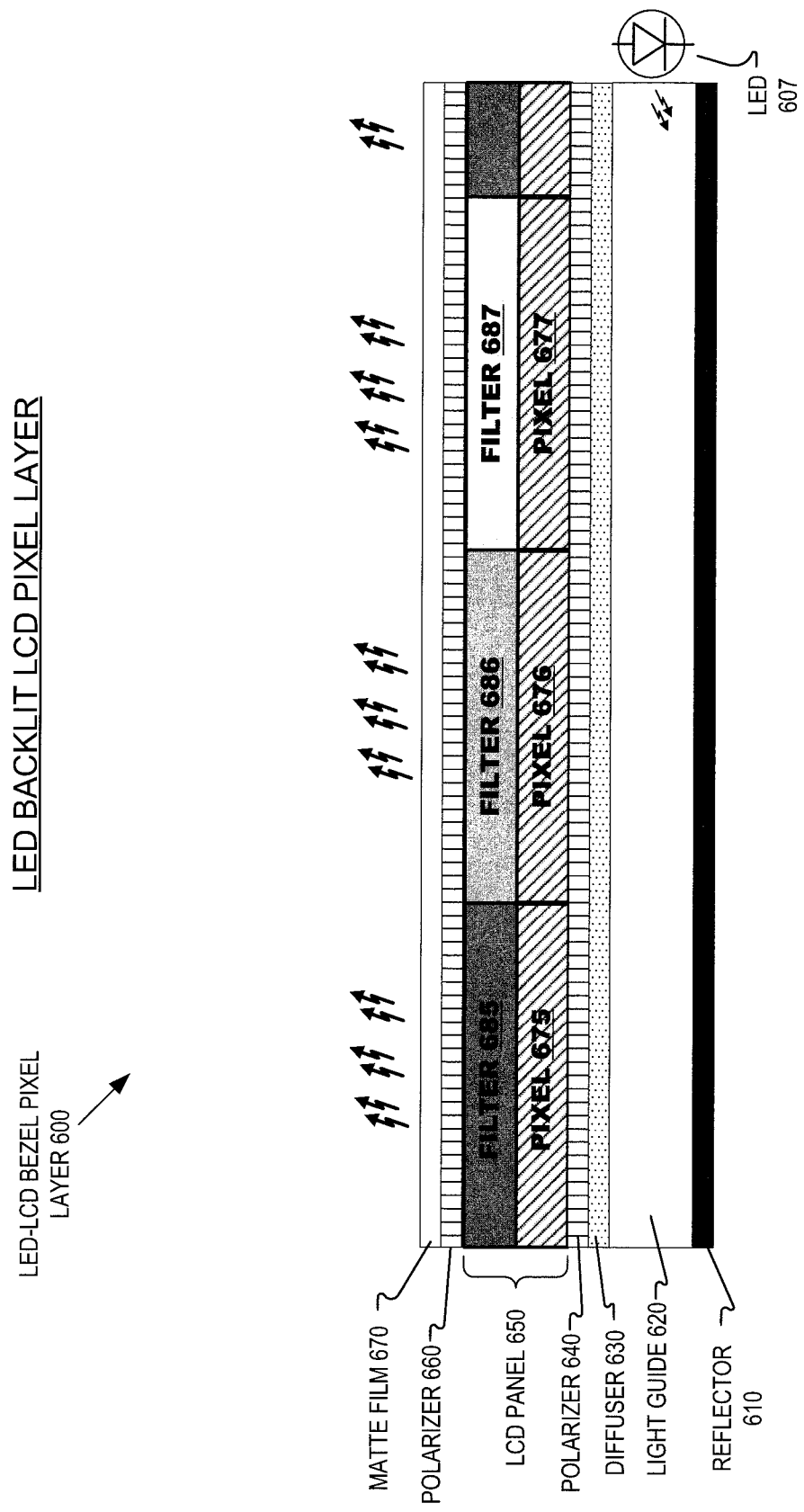
FIG. 6 illustrates an example bezel pixel layer that includes a liquid crystal display ("LCD") having a light-emitting-diode ("LED") backlight, in accordance with an embodiment of the disclosure.

FIG. 6 illustrates a side view of an example LED-LCD bezel pixel layer 600 that includes an LCD having an LED backlight, in accordance with an embodiment of the disclosure. The structure shown in FIG. 6 may be used in bezel pixel layer 233 or 234 as well as in the example bezel pixel subsections illustrated in FIG. 3A-3C. In the illustrated embodiment, LED-LCD bezel pixel layer 600 includes one or more side-illuminating LEDs 607 positioned to emit backlight light into light guide 620. Light guide 620 may include a tapered plastic structure (not pictured) to evenly distribute and direct the backlight light toward LCD panel 650. Reflector 610 and other reflectors (not pictured) may also help direct the backlight light toward LCD panel 650. In the illustrated embodiment, a diffuser 630 and a polarizer 640 are disposed over light guide 620 to prepare the backlight light for LCD panel 650. LCD panel 650 includes a liquid crystal layer including pixels 675, 676, and 677. A red filter 685, a green filter 686, and a blue filter 687 are disposed above pixels 675, 676, and 677, respectively. A polarizer 660 and a matte film layer 670 may be added to LED-LCD bezel pixel layer 600 to make LED-LCD bezel pixel layer 600 generate an appearance very similar to the pixel regions 215 of display panels 200. In one embodiment, LED-LCD bezel pixel layer 600 is approximately 1.0 mm thick.

Figure 7:
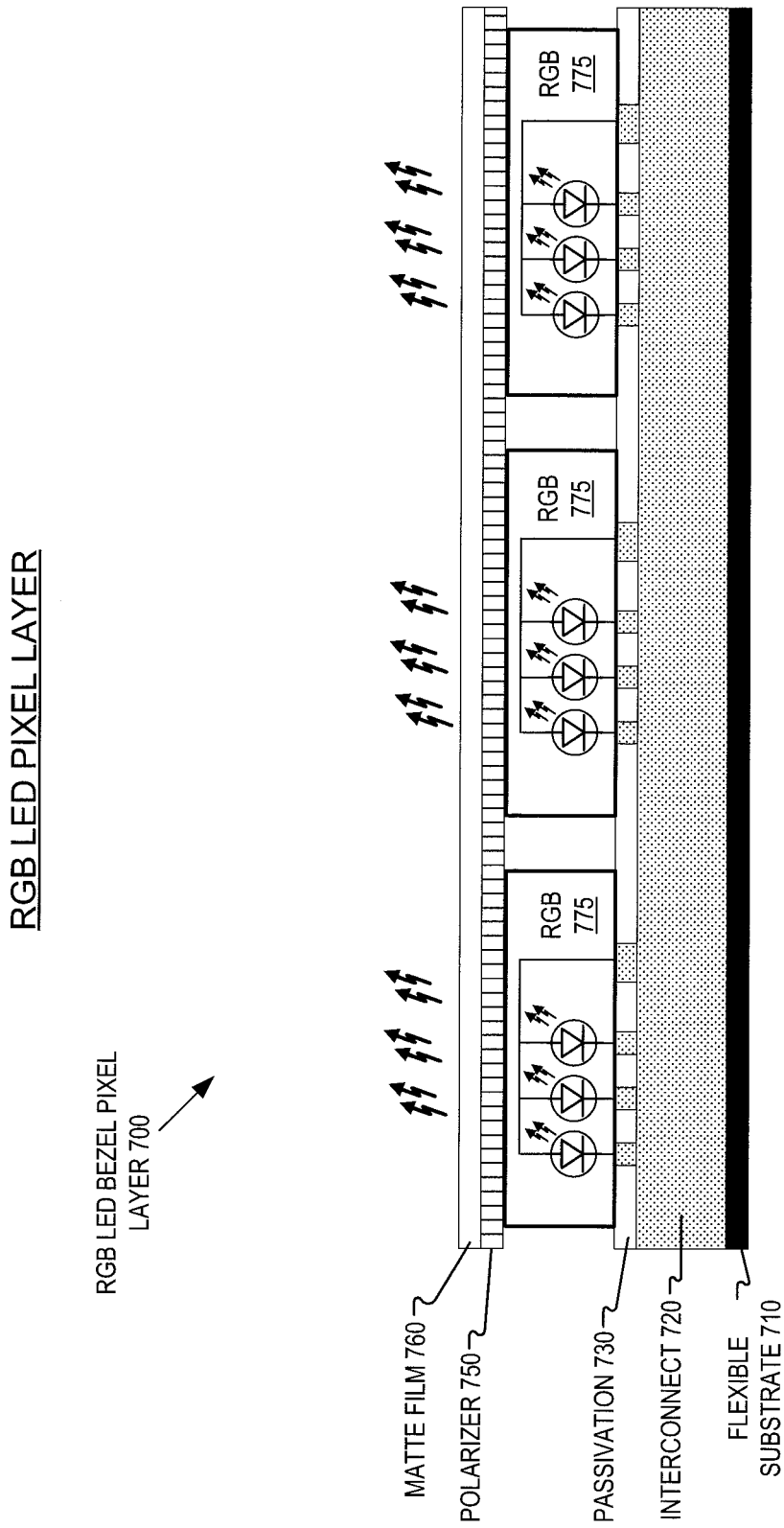
FIG. 7 illustrates an example bezel pixel layer that includes red-green-blue ("RGB") light-emitting-diodes ("LEDs") arranged as pixels of the bezel pixel layer, in accordance with an embodiment of the disclosure.

FIG. 7 illustrates a side view of an example red-green-blue ("RGB") LED bezel pixel layer 700 that includes discrete RGB LEDs 775 arranged as pixels of the RGB-LED bezel pixel layer 700, in accordance with an embodiment of the disclosure. The structure shown in FIG. 7 may be used in bezel pixel layer 233 or 234 as well as in the example bezel pixel subsections illustrated in FIG. 3A-3C. In one embodiment, the RGB LEDs 775 have a 0.3 mm by 0.3 mm pitch. The small pitch may enable the pixels to be disposed very close to the edge of bezel pixel layer 233/234, which will give multi-panel display 205/255 a more homogenous pixel spacing where the edges of the display panels 200 and the bezel pixel layer 233/234 meet.

In the illustrated embodiment, RGB-LED bezel pixel layer 700 includes an interconnect layer 720 disposed on a flexible substrate 710. In one embodiment, a rigid substrate may be substituted for flexible substrate 710. Interconnect layer 720 may include electrical routing and electrical structures such as transistors that drive the RGB LEDs 775. Passivation layer 730 may be formed on top of interconnect layer 720 for electrical isolation. In FIG. 7, interconnect layer 720 extends through passivation layer 730 in order to make electrical connection with the anodes and cathodes of the red, green, and blue LEDs inside the RGB LED package. A polarizer 750 and a matte film layer 760 may be added to RGB LED bezel pixel layer 700 to make RGB-LED bezel pixel layer 700 generate an appearance very similar to the pixel regions 215 of display panels 200. An anti-glare ("AG") film (not pictured) may also be added to RGB LED bezel pixel layer 700.

Figure 8A:
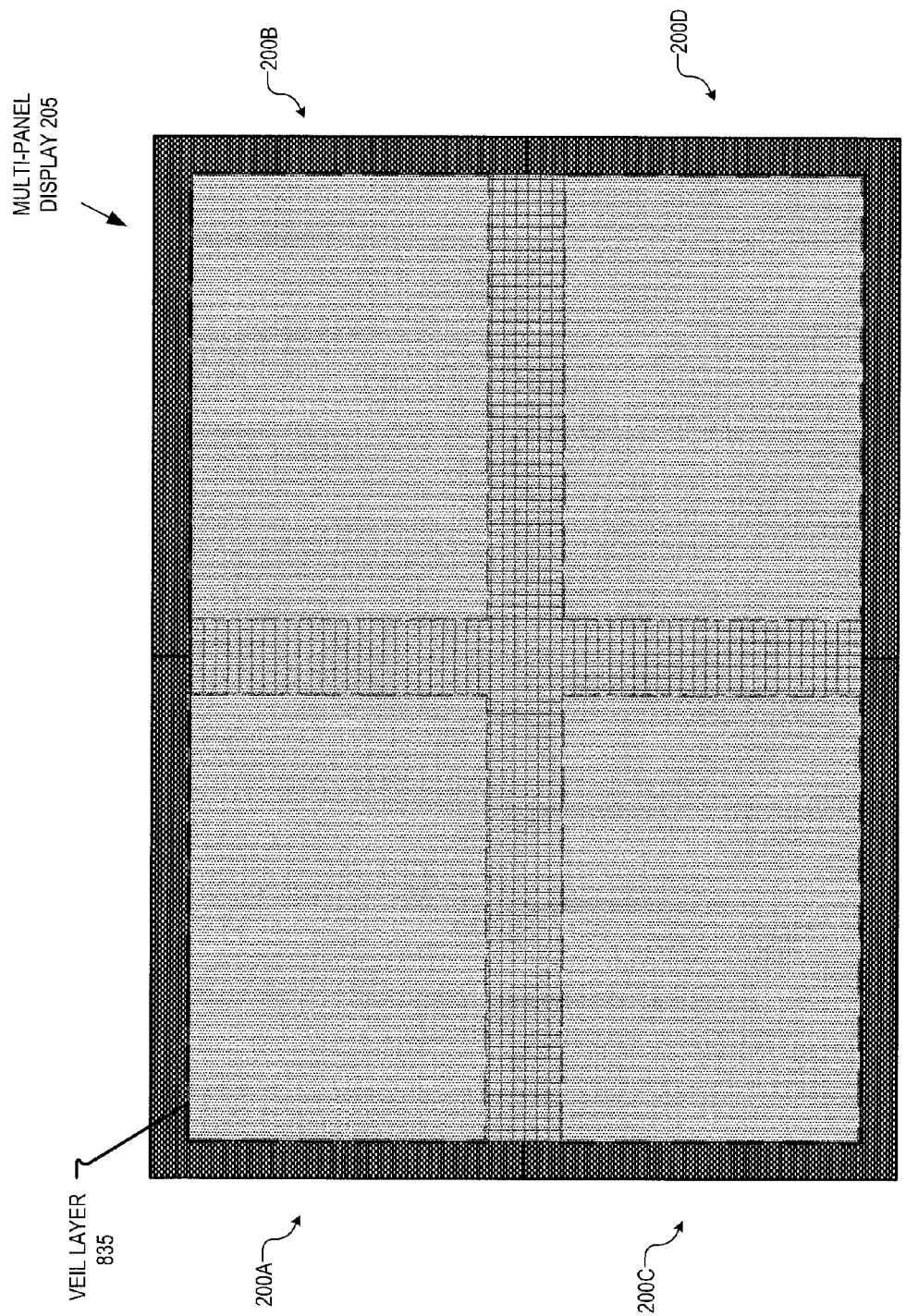
FIGS. 8A and 8B show a multi-panel display including a veil layer, in accordance with an embodiment of the disclosure.
Figure 8B:
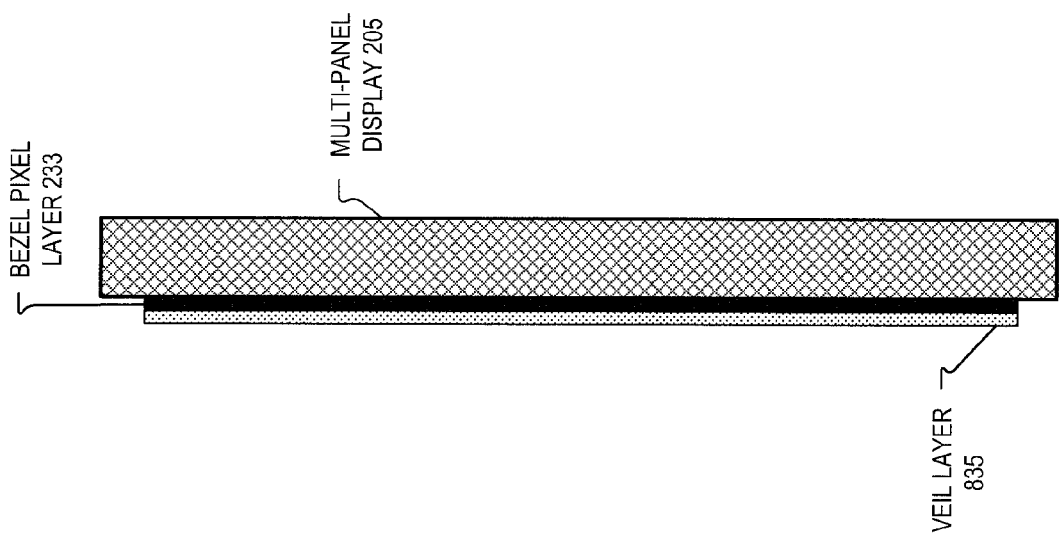

FIGS. 8A and 8B show multi-panel display 205 including a veil layer 835, in accordance with an embodiment of the disclosure. Since bezel pixel layer 233 covers a bezel region of display panels 200, it is disposed at a slightly higher elevation than the pixel regions 215 of the display panels 200 that make up multi-panel display 205. Therefore, the image generated by multi-panel display 205 will not be generated in the same plane and this lack of image planarity may be apparent to a viewer who is viewing multi-panel display 205 from a side angle. To mitigate this effect, a veil layer 835 may be added to multi-panel display 205. Veil layer 835 covers bezel pixel layer 233 and pixel regions 215 of the display panels 200. Veil layer 835 may be a thin film that is semi-transparent and disposed over bezel pixel layer 233 and pixel regions 215. In one embodiment, veil layer 835 is stretch slightly above bezel pixel layer 835.

Figure 9:
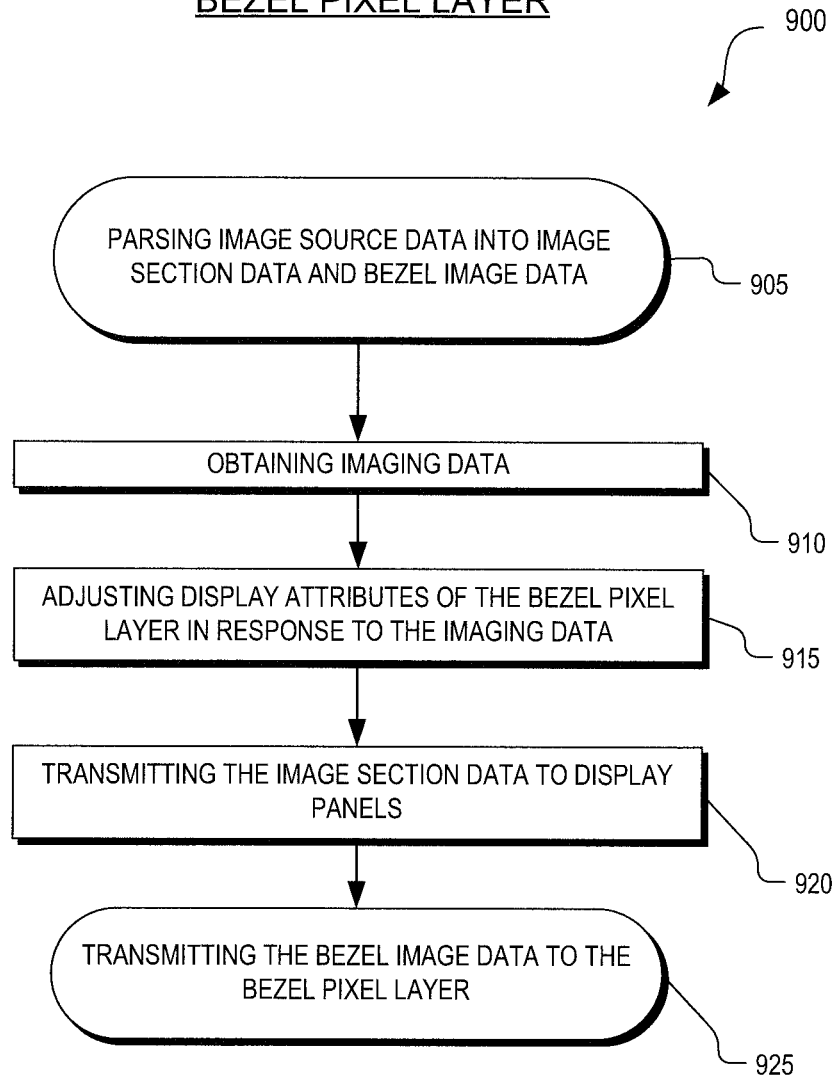
FIG. 9 illustrates a process of operating a display system that includes an array of display panels arranged to be viewed as a multi-panel display and a bezel pixel layer covering a bezel region of the multi-panel display, in accordance with an embodiment of the disclosure.

FIG. 9 illustrates a process 900 of operating a display system (e.g. display system 400) that includes an array of display panels arranged to be viewed as a multi-panel display and a bezel pixel layer covering a bezel region of the multi-panel display, in accordance with an embodiment of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In process block 905, the image source data is parsed into image section data and bezel image data. The image source data may be received from image source 450, for example. The image source data may be encoded image data from a DVD or streaming digital media. The image section data may include data for pixel regions 215A, 215B, 215C, and 215D. The bezel image data may include data to be displayed on bezel pixel layer 233 or 234. Optionally, imaging data is obtained in process block 910. The imaging data is measured by an imaging module (e.g. imaging module 415). Display engine 425 may control imaging module 415 to image multi-panel display 205 to obtain the imaging data or imaging module 415 may send display engine 425 without direction from display engine 425. In one embodiment, the imaging module is included in a mobile device. In process block 915, display attributes of the bezel pixel layer may be adjusted in response to the imaging data. Imaging module 415 may measure image light (e.g. image light 407) and send the imaging data to the display engine and the display engine may analyze the image light and control the bezel pixel layer to adjust display attributes of the bezel pixel layer. In process block 920, display panels (e.g. display panels 200) in a multi-panel display are driven to display the image section data. Display engine 425 may drive display panels 200 in multi-panel display 205. In process block 925, the bezel image data is transmitted to the active pixel layer for display. Process blocks 920 and 925 may be executed in parallel so that multi-panel display 205 displays the bezel image data and the image section data in a same time period to display a unified image.

It is appreciated that although embodiments of the disclosure are largely described with reference to a two-by-two matrix of display panels arranged to be viewed as a multi-panel display (e.g. multi-panel display 205), other configurations (e.g. FIG. 2B) are possible and embodiments of this disclosure can be modified by those skilled in the art to accommodate different configurations.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A multi-panel display system comprising:
an array of display panels arranged to be viewed as a multi-panel display, the multi-panel display including a bezel pixel layer covering a bezel region of the multi-panel display, wherein the bezel region is between pixel regions of the display panels in the array, and wherein the bezel pixel layer is flexible and includes crease lines along which the bezel pixel layer folds when the multi-panel display system is folded;
a display engine communicatively coupled to drive the display panels to display image sections and communicatively coupled to drive the bezel pixel layer to produce image light and display a bezel shaped image section, wherein the image sections and the bezel shaped image section are subsections of a unified overall-image to be displayed on the multi-panel display; and
an image sensor for imaging the multi-panel display, wherein the image sensor is communicatively coupled to provide imaging data captured by the image sensor to the display engine, and wherein the display engine is configured to adjust driving the bezel pixel layer in response to the imaging data.

2. The multi-panel display system of claim 1 further comprising:
a transparent veil layer covering the bezel pixel layer and an entirety of the pixel regions of the display panels in the array.

3. The multi-panel display system of claim 1, wherein the bezel pixel layer includes organic light-emitting-diodes ("OLEDs") arranged as pixels of the bezel pixel layer, and wherein the bezel pixel layer is constructed on a flexible substrate and affixed to the bezel region with adhesive.

4. The multi-panel display system of claim 1, wherein the bezel pixel layer includes red-green-blue ("RGB") light-emitting-diodes ("LEDs") arranged as pixels of the bezel pixel layer.

5. The multi-panel display system of claim 1, wherein the bezel pixel layer includes a liquid crystal display ("LCD") having a light-emitting-diode ("LED") backlight.

6. The multi-panel display system of claim 1, wherein the bezel pixel layer is divided into bezel pixel subsections.

7. The multi-panel display system of claim 1, wherein the multi-panel display includes four display panels arranged in a two-by-two matrix, and wherein the bezel pixel layer is shaped as a cross.

8. The multi-panel display system of claim 1, wherein the multi-panel display includes nine display panels arranged in a three-by-three matrix, wherein the bezel pixel layer are shaped as a pound sign.

9. A display system comprising:
a bezel pixel layer shaped to cover a bezel region of a multi-panel display, wherein the bezel pixel layer is flexible and includes crease lines along which the bezel pixel layer folds when the display system is folded;
a display engine including a processor coupled to receive image source data and communicatively coupled to drive an array of display panels, wherein the display engine is also communicatively coupled to drive the bezel pixel layer;
an image sensor communicatively coupled to the display engine; and a non-transitory machine-accessible storage medium that provides instructions that, when executed by the display system, will cause the display system to perform operations comprising:

parsing the image source data into image section data and bezel image data;

transmitting the image section data to the display panels;

transmitting the bezel image data to the bezel pixel layer, wherein the image section data is for displaying on pixel regions of the display panels, and wherein the image section data and the bezel image data combine to form a unified overall image measuring image light produced by the display panels and the bezel pixel layer with an image sensor; and adjusting display attributes of the bezel pixel layer in response to the measuring the image light.

10. The display system of claim 9, with further instruction stored in the non-transitory machine-accessible storage medium, that when executed by the display system, will cause the display system to perform operations comprising:

analyzing a display brightness and display color properties of the image light generated by the multi-panel display, wherein adjusting the display attributes in response to the image light includes adjusting a global brightness of the bezel pixel layer and adjusting color properties of the bezel pixel layer.

11. The display system of claim 9, wherein the bezel pixel layer includes organic light-emitting-diodes ("OLEDs") arranged as pixels of the bezel pixel layer.

12. The display system of claim 9, wherein the bezel pixel layer includes red-green-blue ("RGB") light-emitting-diodes ("LEDs") arranged as pixels of the bezel pixel layer.

13. The display system of claim 9, wherein the bezel pixel layer includes a liquid crystal display ("LCD") having a light-emitting-diode ("LED") backlight.

14. The display system of claim 9, wherein the bezel pixel layer is divided into bezel pixel subsections.

* * * * *